(12) United States Patent
Dinsdale et al.

(10) Patent No.: US 6,820,898 B2
(45) Date of Patent: Nov. 23, 2004

(54) BIAXIAL DUAL STAGE INFLATOR WITH EXTENDED GAS DELIVERY FOR A VEHICULAR AIRBAG SYSTEM

(75) Inventors: Paul Dinsdale, Farr West, UT (US); Tom Wilson, West Point, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 10/100,928

(22) Filed: Mar. 19, 2002

(65) Prior Publication Data

US 2003/0178827 A1 Sep. 25, 2003

(51) Int. Cl.[7] .............................................. B60R 21/26
(52) U.S. Cl. ..................... 280/737; 280/741; 137/68.13
(58) Field of Search ................. 280/737, 736, 280/741, 742, 728.2, 730.2, 729; 137/68.13

(56) References Cited

U.S. PATENT DOCUMENTS

| | | | |
|---|---|---|---|
| 3,961,806 A | * | 6/1976 | Katter ........................ 280/737 |
| 5,225,940 A | | 7/1993 | Ishii et al. .................. 359/823 |
| 5,273,309 A | | 12/1993 | Lau et al. |
| 5,593,180 A | | 1/1997 | Cuevas et al. .............. 280/741 |
| 5,630,619 A | | 5/1997 | Buchanan et al. .......... 280/741 |
| 5,660,412 A | | 8/1997 | Renfroe et al. |
| 5,709,406 A | | 1/1998 | Buchanan .................... 280/737 |
| 5,762,369 A | | 6/1998 | Mooney et al. ............. 280/741 |
| 5,779,269 A | * | 7/1998 | Moore et al. ................ 280/736 |
| 5,794,973 A | * | 8/1998 | O'Loughlin et al. ........ 280/737 |
| 5,820,161 A | | 10/1998 | Svensson .................... 280/737 |
| 5,951,043 A | | 9/1999 | Mooney et al. ............. 280/741 |
| 5,992,881 A | * | 11/1999 | Faigle ........................ 280/737 |
| 6,010,152 A | | 1/2000 | Swann et al. |
| 6,056,319 A | | 5/2000 | Ruckdeschel et al. |
| 6,062,599 A | | 5/2000 | Forbes et al. |
| 6,073,961 A | | 6/2000 | Bailey et al. |
| 6,086,094 A | * | 7/2000 | Stevens et al. ............. 280/737 |
| 6,095,561 A | | 8/2000 | Siddiqui et al. |
| 6,206,412 B1 | * | 3/2001 | Swann et al. ............... 280/736 |
| 6,254,124 B1 | * | 7/2001 | Angermaier ................ 280/741 |
| 6,293,581 B1 | | 9/2001 | Saita et al. |
| 6,390,499 B1 | | 5/2002 | Leitner et al. |
| 6,390,502 B1 | | 5/2002 | Ryan et al. |
| 6,557,902 B1 | | 5/2003 | Einsiedel et al. |
| 6,572,141 B2 | * | 6/2003 | Nanbu ........................ 280/737 |
| 2001/0038199 A1 | | 11/2001 | Fischer |
| 2001/0048218 A1 | * | 12/2001 | Whang et al. .............. 280/737 |
| 2003/0042719 A1 | * | 3/2003 | Rink et al. .................. 280/736 |

FOREIGN PATENT DOCUMENTS

| | | | |
|---|---|---|---|
| DE | 19701663 | 7/1998 | ........... B60R/21/26 |
| EP | 949126 A2 * | 10/1999 | ........... B60R/21/26 |
| JP | 2000-296751 | 10/2000 | ........... B60R/21/22 |
| WO | WO99/32334 | 7/1999 | ........... B60R/21/26 |

* cited by examiner

*Primary Examiner*—Peter C. English
(74) *Attorney, Agent, or Firm*—Sally J. Brown (57) ABSTRACT

A dual flow inflator for airbags is disclosed, together with related manufacturing, installation, and deployment methods. The inflator includes a primary gas chamber with a first exit orifice and a secondary gas chamber in gaseous communication with the primary gas chamber. The inflator also includes a flow restrictor positioned between the gas chambers. In use, the inflator provides primary and secondary flows of gas from the exit orifice. The primary gas chamber may include multiple exit orifices in order to provide axial gas flows in opposite directions upon activation so that each gas flow neutralizes the thrust of the other. The exit orifices may comprise frangible structures such as burst discs, scored surfaces, and compression closures.

34 Claims, 3 Drawing Sheets

BIAXIAL DUAL STAGE INFLATOR WITH EXTENDED GAS DELIVERY FOR A VEHICULAR AIRBAG SYSTEM

BACKGROUND OF THE INVENTION

1. Field of the Invention

The present invention relates to systems and methods for protecting vehicle occupants from injury. More specifically, the present invention relates to a dual stage biaxial inflator that injects multiple gas flows along a substantially identical axis in opposing directions into an airbag system, such as an inflatable curtain, and that provides an extended gas delivery period.

2. Description of Related Art

The inclusion of inflatable safety restraint devices, or airbags, is now a legal requirement for many new vehicles. In addition to this, inflatable airbags enjoy widespread acceptance for use in motor vehicles and are credited with preventing numerous deaths and injuries. Some studies estimate that the use of frontally-placed airbags reduces the number of fatalities in head-on collisions by 25% among drivers using seat belts and by more than 30% among unbelted drivers. Other research suggests that in a frontal collision, the combination of a seat belt and an airbag can reduce serious chest injuries by 65% and serious head injuries by up to 75%. These numbers and the thousands of prevented injuries they represent demonstrate the life-saving potential of airbags and the need to encourage their use, production, and development.

As a result in part of benefits such as those described above, automakers are now required to install airbags in most new vehicles bound for sale in the United States. Many automobile manufacturers have turned this requirement of implementation of airbag technology into a marketing tool. Enticed by the promise of added safety, vehicle purchasers frequently seek out vehicles with sophisticated airbag systems.

Airbags are typically installed in the steering wheel and in the dashboard on the passenger side of a car. In the event of an accident, an accelerometer situated within the vehicle measures the abnormal deceleration caused by the accident and triggers the expulsion of rapidly expanding gases from an inflator into each of the airbags. The expanding gases rapidly fill the airbags, which immediately inflate in front of the driver and passenger to protect them from impact against the windshield, dashboard, or steering wheel. Thus used, vehicular airbags have saved countless human lives.

As a result of the success of front-installed airbags, other airbags designed to protect occupants in other types of vehicular collisions have been developed. Side impact airbags, often in the form of inflatable curtains, were one such airbag developed in response to the need for protection from impacts in a lateral direction, or against the side of the vehicle. Such curtains are placed along the side of a vehicle in places such as the ceiling or roof rails. An inflatable curtain may be composed of one or more separately inflated cushions that protect individual passengers in different positions within the vehicle.

Side impact cushions are often designed to unfold or unroll downward from their installation site to inflate beside a vehicle occupant to keep the vehicle occupant from hitting the door or window during a lateral impact event. Since the vehicle occupant may be leaning forward, reclined in the seat, or at any position between, such cushions are often made somewhat long to ensure that even such an "out-of-position" occupant hits the cushion.

In some installations, multiple cushions may be fed by a single inflator as a result of space constraints or other considerations. The inflator may be placed at either end of a cushion. In situations where multiple cushions are fed by a single inflator positioned either fore or aft of the cushions, an especially long gas flow path exists between the inflator and the cushion furthest from the inflator. This long gas flow path may reduce the speed of the gas flow, thus resulting in delayed inflation of the furthest cushions. Furthermore, the outermost extents of an inflatable curtain in such an installation may receive insufficient inflation gas pressure to inflate the curtain to the optimal protective pressure.

Even in somewhat shorter cushions, rapid and even inflation can be difficult to achieve with known inflator designs. Many existing inflators eject inflation gases outward radially. As a result of this, the inflation gases are not propelled along the length of the cushion with sufficient force to reach its outer edges, but are instead largely directed into the cushion near the inflator. The outer regions of the cushion are thus inflated later than those closest to the inflator.

Additionally, some inflatable curtain systems are somewhat expensive due to the need for multiple inflators, attachment mechanisms, and the like. Many inflatable curtain systems require the use of a "gas guide," or conduit that conveys gas from the inflator to the inflatable curtain. Some known inflators require the use of multiple initiators that add to the manufacturing expense and timing requirements of the inflator.

In addition to this, in collisions which result in vehicle rollovers, the time period during which a vehicle occupant may be injured by striking a lateral side of the vehicle is often much longer than in a conventional collision. As a result of this, it would be beneficial to the occupants for the airbags to remain inflated during that period in order to protect them from injury. Conventional inflators, however, are largely incapable of providing such a long inflation.

Further, in some collisions, it would be beneficial for an airbag inflator to be "smart," or capable of providing different amounts of gas to an airbag to give it different hardnesses in response to different collisions. Most currently known airbags are capable of providing a single inflation pressure. Similarly, some benefit would be gained from an inflator that is capable of providing a secondary flow of inflation gas at a slight delay from a primary flow of inflation gas in order to either maintain inflation of an airbag or reinflate an airbag.

In addition to the above, it should be noted that many airbag inflators currently used in vehicles produce thrust upon activation. As a result of this thrust, complex attachment mechanisms must often be used to affix the inflators to the vehicle in which they are installed to ensure that the inflators do not dislodge themselves during deployment. Inflators expel gas with such force that if they were to be dislodged from their placement, they could endanger vehicle occupants. Such additional attachment parts often increase the cost of the inflatable curtain system, as well as the time and expense required to install the inflatable curtain system in a vehicle. Complicated attachment mechanisms may also pose engineering problems which are time-consuming and expensive to resolve.

Accordingly, a need exists for an inflator and related methods that remedy problems found in the prior art. Such an inflator should preferably provide relatively even and rapid inflation of an associated inflatable curtain, preferably without requiring multiple inflators for a single curtain, and preferably while producing little or no thrust. Such an inflator should also preferably be simple and inexpensive to manufacture and install.

SUMMARY OF THE INVENTION

The apparatus of the present invention has been developed in response to the present state of the art, and in particular, in response to the problems and needs in the art that have not yet been fully solved by currently available inflators. Thus, it is an overall objective of the present invention to provide a dual stage biaxial inflator and related systems and methods that provide rapid, even inflation of an airbag such as an inflatable curtain with a minimum of manufacturing and installation cost.

To achieve the foregoing objective, and in accordance with the invention as embodied and broadly described herein in the preferred embodiment, a dual stage biaxial inflator having a primary gas chamber, a flow restrictor, and a secondary gas chamber is disclosed. The inflator may comprise a primary gas chamber with a first end disposed within a first inlet port of the inflatable curtain and a second end disposed within a second inlet port of the inflatable curtain. The primary gas chamber may comprise one unitary body. The first and second inlet ports may be tightly affixed to the gas chamber such that gas is unable to escape from the inflatable curtain between the inlet ports and the gas chamber. The secondary gas chamber may be in gaseous communication with the primary gas chamber through the flow restrictor, which is positioned between the primary gas chamber and the secondary gas chamber. The inflator may additionally include an initiator in communication with at least one of the gas chambers for initiating a flow of gas through the exit orifices.

The primary gas chamber may have a first exit orifice positioned at a first end and a second exit orifice positioned at a second end. Each exit orifice may have a sealed configuration that does not permit gas flow, and an open configuration, in which inflation gases flow relatively freely out of the gas chamber through the exit orifice. Each exit orifice may take the form of an interior cap with an opening covered by a burst disc; the burst discs may be removed from the openings via a pressure shock induced by combustion within the gas chamber. Burst disc retention members may be disposed outside the openings to capture the burst discs and ensure that they do not damage the inflatable curtains.

Each exit orifice may also have an ejection nozzle that controls the flow of inflation gas out of the exit orifice. The ejection nozzles may be aligned with the longitudinal axis of the inflator so that inflation gases are ejected along the longitudinal axis. The ejection nozzles of the first and second exit orifices may be directed opposite to each other so that thrust from the first exit orifice substantially negates the thrust from the second exit orifice, and vice versa. As a result, the inflation gases are ejected in directions substantially opposite each other.

The secondary gas chamber is positioned in gaseous communication with the primary gas chamber through the flow restrictor. The flow restrictor has a flow restrictor orifice that in some inflators has a sealed configuration and an open configuration. In those inflators where the flow restrictor has only an open configuration, inflation charges placed within the primary and secondary gas chambers may be allowed to mingle. In those inflators that include a flow restrictor having a sealed configuration, the seal may be formed by a frangible seal such as a burst disc, scored surface, or compression seal. Inflators that have burst discs may also have burst disc retention members to retain the burst disc after initiation of the inflator.

The flow restrictor that connects the primary and secondary gas chambers may simply include a restricted flow channel. This channel is defined using methods known in the art to be sufficiently narrow to meter the flow of an inflation gas produced by the inflation charge of the secondary gas chamber such that the flow of gas is lengthened out to a predetermined duration. This duration could be selected by tuning the diameter of a restricted flow channel.

The inflator may have an initiator disposed within the assembly that activates a gas-producing material to create first and second primary gas flows through the first and second exit orifices of the primary gas chamber, respectively. The initiator assembly may be positioned within the primary gas chamber, the secondary gas chamber, or both gas chambers.

The inflator of the invention may also include a gas generant, or gas-producing material in the form of a solid, liquid, gas, or liquid/gas mixture that has been cryogenically inserted into the gas chambers in solid form. The initiator of the inflator is positioned to heat the liquid/gas mixture, thus causing gas generation and initiating the rise in pressure or pressure shock. This increase in pressure or pressure shock may remove the burst discs from the openings or otherwise place the exit orifices into their open configurations. This change in configuration allows the flows of gas from the exit orifices to begin.

The inflator of the invention is capable of providing primary and secondary gas flows to inflate and then maintain the inflation of an airbag or inflatable curtain. The primary gas flow is provided primarily by the inflation charge housed within the primary gas chamber or chambers. This primary gas flow is split into a first and a second primary gas flow, proceeding from the first and second exit orifices, respectively, of the primary chamber. This primary gas flow is largely responsible for the initial inflation of the airbag or inflatable curtain. The secondary gas flow is produced primarily from the inflation charge housed within the secondary gas chamber or chambers. This secondary flow of gas is triggered either passively as the pressure of the primary gas chamber decreases, or actively by a pressure gradient which could be created by an initiator associated with the secondary gas chamber. This secondary flow of gas proceeds out of the secondary gas chamber into the primary gas chamber, and is then split into first and second secondary gas flows which are ejected from the first and second exit orifices, respectively. This secondary flow of gas may be used to maintain the inflation of the airbag or inflatable curtain, or, in some cases, to reinflate it. In addition, in so-called "smart" airbag systems, the secondary flow of gas may be initiated in response to collisions of a particular nature or severity, or initiated only when the vehicle occupant to be protected by the inflatable cushion is of a certain size or weight.

According to one alternative, the inflator may comprise multiple secondary and/or primary gas chambers in order to provide a controllable, customizable flow of gas. The gas chambers may be vessels having a generally tubular shape. As discussed briefly above, these chambers may have frangible seals such as the openings and burst discs discussed above, or scored, or notched, surfaces that open when the pressure within the gas chamber exceeds the strength of the scored regions. The scored surface may open to form a suitable exit nozzle. Additionally, the frangible seal may be a compression closure, such as a crimped opening. The crimped opening may have two lips pressed flat together and attached through a method such as welding. As with the scored region, the crimped opening opens in response to a pressure shock and/or increase within the gas chamber, and may be configured to form a suitable exit nozzle upon opening. In each of these alternatives, some physical puncture mechanism may be used to assure that the frangible seal opens when activated by the initiator.

As with the previous inflator, a gas-producing material such as a compressed gas and liquid mixture may be thermally activated by an initiator to provide first and second primary and secondary gas flows through the first and second exit orifices, respectively. In order to ensure that the frangible seals over both exit orifices burst completely and simultaneously, tight tolerancing of the burst discs, scored surfaces, or compression seals may be implemented.

According to another embodiment of the invention, the dual stage biaxial inflator for a vehicular airbag system may include a first primary gas chamber having a first longitudinal axis and a first exit orifice configured to provide a first primary gas flow oriented substantially along the longitudinal axis, the first exit orifice having an open and a closed configuration. Additionally, the inflator may include a second primary gas chamber having a second longitudinal axis and a second exit orifice configured to provide a second primary gas flow oriented substantially along the longitudinal axis; the second exit orifice having an open and a closed configuration. The inflator additionally has a secondary gas chamber in gaseous communication with said first and second primary gas chambers configured to provide a secondary gas flow and a flow restrictor positioned between each primary gas chamber and the secondary gas chamber. The inflator also includes an initiator in communication with the interior of one of said gas chambers, the initiator being configured to selectively initiate a flow of gas through the exit orifice.

In this inflator, the secondary gas chamber may be located between the first and second primary gas chambers. The first and second exit orifices of the first and second primary gas chambers may be configured to provide first and second primary gas flows which have substantially equivalent amounts of gas. Further, the first and second exit orifices may be configured to provide first and second primary gas flows which have different amounts of gas. In addition, the inflator may be constructed so that the first longitudinal axis and the second longitudinal axis are equivalent. In inflators where the first and second primary gas flows are identical, and where the first and second longitudinal axes are identical, a substantially zero-thrust inflator may be provided. Such a zero-thrust inflator may be provided under the first embodiment, as well. In this inflator, each primary gas chamber may have its own initiator. Additionally, the secondary gas chamber may have its own initiator.

Through the use of the inflators of the present invention, cost savings may be obtained through the elimination of gas guides, complex attachment features, and redundant inflators and initiators. Additionally, more rapid and even inflation of the inflatable curtains may be obtained, and sustained inflation of the inflatable curtains may be achieved. As a result, the availability and effectiveness of vehicular airbag systems may be enhanced.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 2:
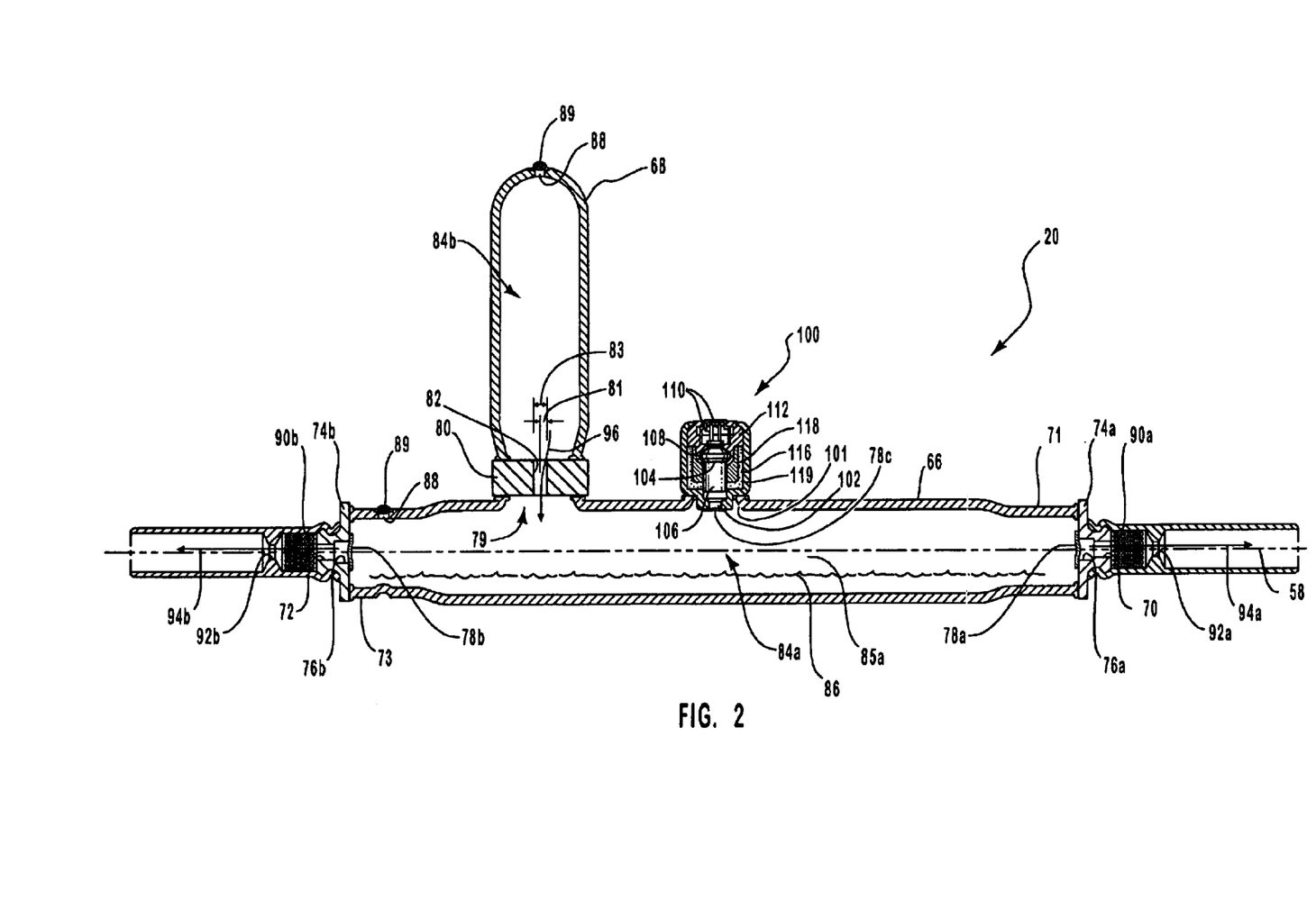
FIG. 2 is a side elevation cross sectional view of the inflator of FIG. 1.
Figure 3:
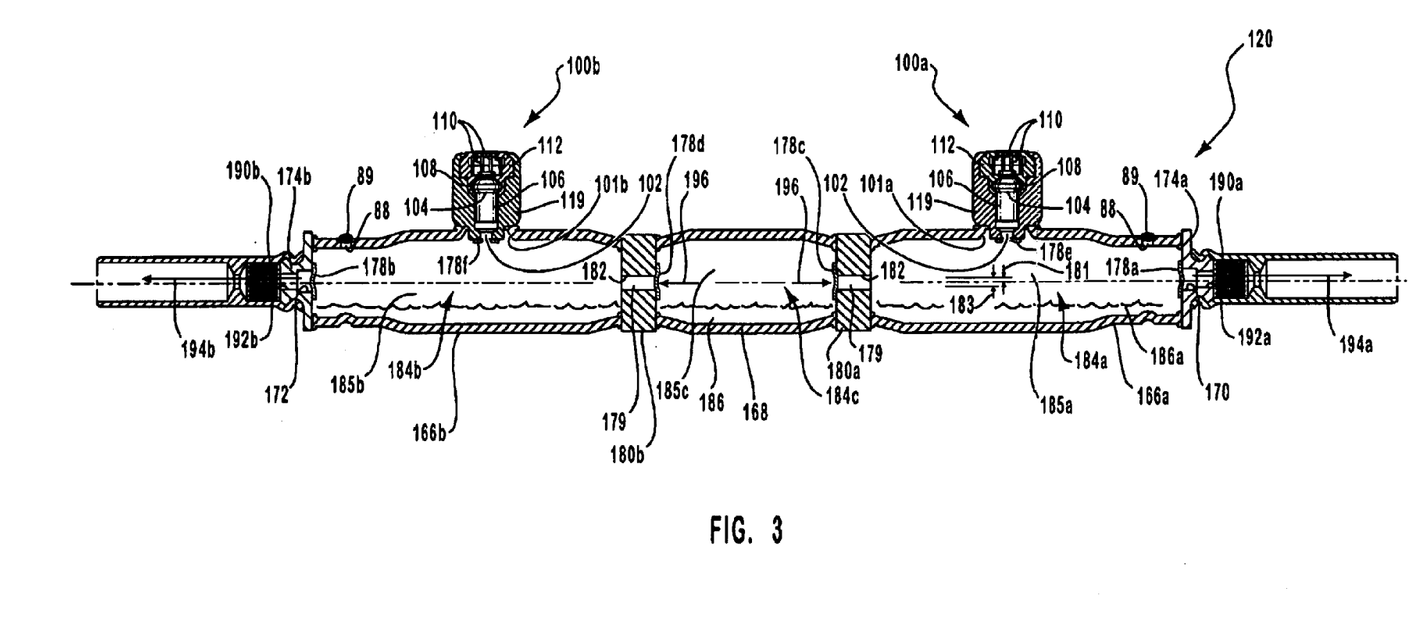
FIG. 3 is a side elevation cross sectional view of an alternative embodiment of an inflator according to the invention.

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the apparatus, system, and method of the present invention, as represented in FIGS. 1 through 3, is not intended to limit the scope of the invention, as claimed, but is merely representative of presently preferred embodiments of the invention.

The present invention provides an apparatus and method whereby problems associated with previously known inflators can be resolved. More specifically, through the use of counterbalancing axial flows, a thrust neutral design may be obtained. This eliminates the complexity of axially supported inflator mounting. Furthermore, a single-initiator configuration provides simplicity of manufacturing and activation.

Yet further, inflation gas can be simultaneously injected into multiple inlet ports in an inflatable curtain to enhance the speed of curtain deployment. Through the use of axial flow, inflation gas can be injected away from exit orifices of the inflator. Hence, the inflatable curtain deploys more evenly to provide better occupant protection. The manner in which these principles are utilized in the present invention will be shown and described in greater detail in the following discussion.

Figure 1:
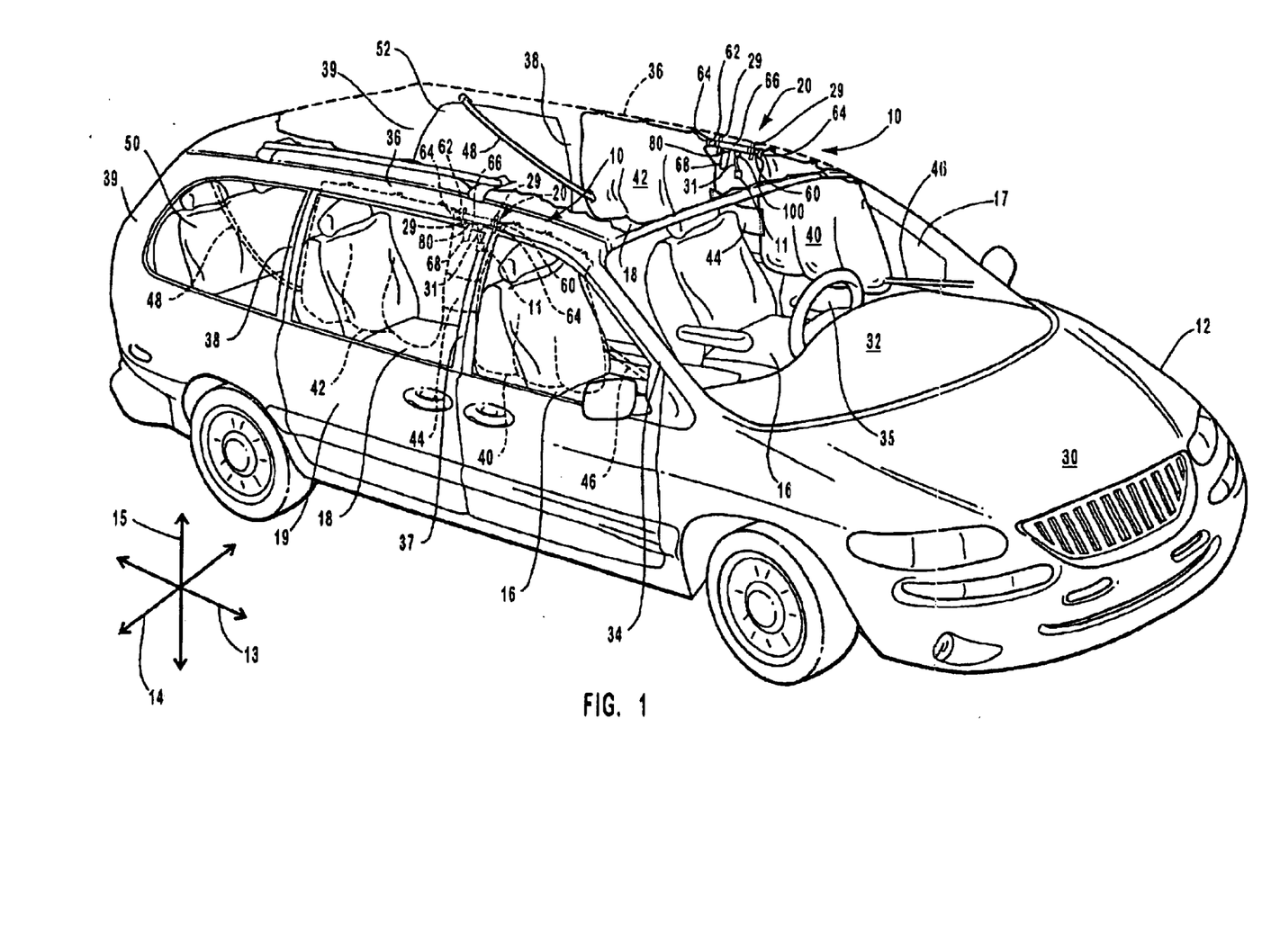
FIG. 1 is a perspective view of a vehicle with an inflatable curtain that incorporates one embodiment of an inflator according to the invention.

Referring to FIG. 1, an inflatable curtain 10 according to one embodiment of the invention is shown installed in a vehicle 12. The inflatable curtain 10 may form part of an airbag system configured to protect one or more vehicle occupants against lateral impact through the formation of a protective curtain beside the occupants.

The vehicle 12 has a longitudinal direction 13, a lateral direction 14, and a transverse direction 15. The vehicle 12 further has front seats 16 laterally displaced from first lateral surfaces 17, or front doors 17, as shown in the vehicle 12 of FIG. 1. The vehicle 12 also has rear seats 18 laterally displaced from second lateral surfaces 19, or rear doors 19, as depicted. As shown, two such inflatable curtains 10 may be used: one for the driver's side of the vehicle 12, and the other for the passenger's side.

One or more accelerometers 11 or other similar impact sensing devices are used to detect sudden lateral acceleration (or deceleration) of the vehicle 12 and transmit electric signals via electric lines 31 to one or more inflators 20 that provide flows of pressurized gas to inflate the inflatable curtains 10. As shown in FIG. 1, a single inflator 20 may be used to inflate each of the inflatable curtains 10. Specifically, a single inflator 20 may be used to inflate the first protection zone 40 and the second protection zone 42 of each inflatable curtain 10. The inflator 20 may be affixed to the vehicle 12 through the use of relatively simple mounting brackets 29.

The inflators 20 may be positioned approximately midway along the longitudinal length of the inflatable curtains 10 to provide relatively rapid and even inflation of the first and second protection zones 40, 42 in a manner that will be described in greater detail subsequently. Each of the inflators 20 may take the form of a hollow pressure vessel containing a chemically reactive material and/or compressed gas referred to as an "inflation charge" that can be activated or released upon initiation of the inflator 20 to provide an outflow of inflation gases. In the embodiment of FIG. 1, the inflators 20 are partially enveloped within the inflatable curtains 10 so that inflation gases exiting the inflators 20 flow directly into the inflatable curtains 10. The inflators 20 may operate with such rapidity that, before the vehicle 12 has fully reacted to the impact, the inflatable curtains 10 have inflated to protect vehicle occupants from impact. Additionally, the inflators 20 may operate in such a prolonged manner that the inflatable curtains may remain inflated or be reinflated throughout the impact event or vehicle rollover.

Optionally, the accelerometer 11 may be stowed within an engine compartment 30 or dashboard 32 of the vehicle 12. A controller (not shown) may also be used to process the output from the accelerometer 11 and control various other aspects of a vehicle safety system of the vehicle 12. Such a controller may also, for example, be positioned in the engine compartment 30 or dashboard 32, proximate the accelerometer 11. Such a controller could be configured to sequentially fire the initiators in a "smart airbag" when a rollover event or other event requiring extended inflation was detected. In such configurations, the electric line 31 and/or other control wiring may be disposed along the A pillars 34 of the vehicle 12, located on either side of the windshield 35, to reach the inflators 20. Alternatively, each accelerometer 11 may be positioned near one of the inflators 20, as shown in FIG. 1.

The inflators 20 and the inflatable curtains 10 may be installed by attaching them to roof rails 36 of the vehicle 12. Depending on the model of the vehicle 12 and the desired configuration of the inflatable curtains 10, airbag components may also be disposed along the B pillars 37, C pillars 38, and/or D pillars 39.

The inflatable curtains 10 shown in FIG. 1 are configured to protect not only occupants of the front seats 16, but those of the rear seats 18 as well. Thus, each inflatable curtain 10 may have a first protection zone 40 configured to inflate between a front seat 16 and one of the front doors 17, and a second protection zone 42 configured to inflate between a rear seat 18 and a rear door 19. The first and second protection zones 40, 42 may be adapted to be separate individual cushions that are isolated from each other. However, the inflatable curtains 10 may optionally be parts of the same cushion, i.e., the first and second protection zones 40, 42 may be in fluid communication with each other. This could be true even when inflation gas is able to flow through the inflator 20 between the first and second protection zones 40, 42, or if there is no flow allowed through the inflator. The first and second protection zones 40, 42 of each inflatable curtain 10 may be attached together through the use of a connection zone 44 positioned between the protection zones 40, 42. The connection zone 44 may provide a flow path through which gases can flow between the first and second protection zones 40, 42.

Each of the inflatable curtains 10 may have a front tether 46 attached to the A pillar 34 and a rear tether 48 attached to the roof rail 36 to exert tension on the inflatable curtains 10 to keep them in place during inflation and impact. Those of skill in the art will recognize that the tethers 46, 48 may also be attached to other parts of the vehicle 12, such as the B pillars 37, C pillars 38, and/or D pillars 39. The tethers 46, 48 may be constructed of standard seatbelt webbing or the like.

Although each inflatable curtain 10 in FIG. 1 has two protection zones 40, 42, the invention encompasses the use of inflatable curtains with any number of protection zones. Thus, if desired, each of the inflatable curtains 10 may be extended to have one or more protection zones positioned to protect occupants of extra seats 50 behind the rear seats 18 from impact against third lateral surfaces 52 of the vehicle 12. Additional inflators 20 may be used to inflate such additional protection zones.

The inflators 20 of the invention may be uniquely configured to provide rapid, even inflation as well as simple and inexpensive manufacturing and installation. FIG. 1 further shows a slightly enlarged perspective view of an inflator 20 including primary gas chamber 66, secondary gas chamber 68, and flow restrictor 80. The inflator also comprises initiation assembly 100, attached to the accelerometer 11 of the vehicle 12 by electric line 31. The inflator 20 is attached to the first and second inlet ports 60, 62, of the inflatable curtain 10 by clamps 64. Additionally, the inflator 20 is attached to the vehicle 12 by mounting brackets 29. The configuration of the inflator 20 will be described in greater detail in connection with FIG. 2.

Referring to FIG. 2, a side elevation, cross sectional view of the inflator 20 is shown. The inflator 20 may have a primary gas chamber 66 formed of a material with a comparatively high tensile strength such as steel, for retaining the inflation charge. The primary gas chamber 66 may be formed of a single, unitary piece. In the alternative, the primary gas chamber 66 may be made from multiple pieces that are welded or otherwise attached together. The primary gas chamber 66 may have a generally tubular shape, but may also be flattened, hemispherical, or otherwise shaped to accommodate the space available in a vehicle.

The primary gas chamber 66 may be positioned within the first and second inlet ports 60, 62 of the protection zones 40, 42 of inflatable curtain 10 so that inflation gas from the first and second primary flows of gas 94a, 94b leaving the primary gas chamber 66 directly enters the first and second protection zones 40, 42. Hence, no gas guide or other type of conduit used to channel the inflation gas from the inflator 20 to the inflatable curtain 10 is required. The inflator 20 may simply be clamped in gas-light fashion within the inlet ports 60, 62, for example, through the use of ring-shaped clamps 64 that tightly press the fabric of the inlet ports 60, 62 against the outer surface of the inflator 20.

The dimensions of the primary gas chamber 66 may be varied to suit the volume in which the primary gas chamber 66 is to be installed. For example, the primary gas chamber 66 may be made longer in the longitudinal direction 13 and/or thinner in the lateral and transverse directions 14, 15 to facilitate installation in a long, narrow space such as the space beside the roof rail 36. A longer primary gas chamber 66 may be installed such that the primary gas chamber 66 extends a significant distance into each protection zone 40, 42. Such installation may advantageously provide inflation gas flows that enter the inflatable curtain 10 about midway through the protection zones 40, 42 for more even inflation.

The primary gas chamber 66 may have a first exit orifice 70 disposed within the first inlet port 60 of the airbag and a second exit orifice 72 disposed within the second inlet port 62 of the airbag. The exit orifices 70, 72 have an open configuration, in which inflation gas can pass relatively freely through them, and a sealed configuration, in which substantially all inflation gasses are trapped within the primary gas chamber 66. Consequently, herein "exit orifice" refers to a passageway as well as to the structure that provides selective closure of the passageway.

More precisely, the exit orifices 70, 72 include an interior cap 74a, 74b, as illustrated in FIG. 2. This interior cap 74a, 74b may have an opening 76a, 76b against which a burst disc 78a, 78b is pressed by the pressure within the gas chamber 66. A third burst disc, 78c, may be placed over the initiator aperture 102, and be held in place, at least in part, against the initiator assembly 100, by the pressure within the chamber 66. The burst discs 78a, 78b, 78c may have a wide variety of configurations. Specifically, if desired, each of the burst discs 78a, 78b, 78c may have a slightly domed shape to provide a tight seal with the circular shape of the associated opening 76a, 76b, 102.

The burst discs 78a, 78b, 78c are preferably shaped to deflect under a pressure shock and/or increase to uncover the openings 76a, 76b, 102. For example, the burst discs 78a, 78b may be made to bend enough to fit through the openings 76a, 76b, so that a pressure shock and/or increase ejects the burst discs 78a, 78b from the openings 76a, 76b. The burst discs 78a, 78b may simply have a pressure threshold above which sufficient deformation occurs to push the burst discs 78a, 78b through the openings 76a, 76b. Alternatively, the burst discs 78a, 78b, 78c may deform primarily in response to shock, or rapid pressure changes within the gas chamber 66.

In order to prevent the ejected burst discs from damaging the inflatable curtain 10, the inflator 20 may also have a pair of burst disc retention members 90a, 90b, each of which is disposed outside one of the exit orifices 70, 72. The burst disc retention members 90a, 90b may have a wide variety of configurations. As illustrated, the burst disc retention members 90a, 90b may take the form of thickened pads or screens through which inflation gases pass relatively freely. The burst discs 78a, 78b, 78c are captured by the burst disc retention members 90a, 90b after ejection from the openings 76a, 76b. The burst discs 78a, 78b, 78c may remain in front of the openings 76a, 76b, in which case inflation gases must simply flow around the burst discs 78a, 78b, 78c to exit the inflator 20.

The inflator 20 may also have ejection nozzles 92a, 92b disposed outside the first and second exit orifices 70, 72 and the burst disc retention members 90a, 90b. These ejection nozzles 92a, 92b may assist in modifying the amount and/or speed of the primary and secondary flows of gas that issue from the inflator. In many inflators of the invention, the ejection nozzles 92a, 92b are tuned equally to provide an equal thrust and amount of gas flow through each nozzle. Such a configuration yields an inflator with no net thrust along the longitudinal axis of the inflator.

Inflators according to the invention may alternatively be made in a non-thrust-neutral manner. For example, the first and second exit orifices 70, 72, or the ejection nozzles 92a, 92b need not be equal in size, but may be sized differently to provide varying amounts of inflation gas out of each exit orifice. Such unequal flows may be desirable in circumstances where the first and second protection zones 40, 42 are sized differently. In such a circumstance, the thrust from one of the gas flows 94a, 94b or 96a, 96b may only partially negate the thrust of the other gas flow 94a, 94b, or 96. Varying degrees of longitudinal support may be provided to account for such inequalities in thrust.

The dual-stage inflator 20 of this invention also includes a secondary gas chamber 68 and a flow restrictor 80. This secondary gas chamber 68 is configured to retain an inflation charge including a gas generant 84b, and to provide a secondary flow of gas 96 into the primary gas chamber 66. The secondary gas chamber 68 is configured to retain an inflation charge in a manner similar to the primary gas chamber 66. The inflation charge of the secondary gas chamber 68 may be the same as the inflation charge of the primary gas chamber 66, or alternatively, the inflation charge may be different in composition, pressure, or form.

The secondary gas chamber 68 is connected to the primary gas chamber 66 by a flow restrictor 80. This flow restrictor 80 may be shaped as a connecting ring with a flow restrictor orifice 82. The flow restrictor 80 may additionally comprise a frangible seal such as a burst disc, a scored surface, or a compression seam.

The secondary gas chamber 68 of this invention is configured to provide a secondary flow of gas 96 to an airbag coupled to the inflator 20 to initially inflate the airbag, and then to maintain that inflation for a period of time. The initial inflation may be largely provided by the inflation charge of the primary gas chamber 66 and the first and second primary flows of gas 94a, 94b it produces. The maintenance of the initial inflation may largely be provided by the secondary flow of gas 96 from the secondary gas chamber 68. The maintenance, or secondary flow of gas 96 may be delivered by providing a flow restrictor 80 that may take the form of a restricted flow channel 79. Such a restricted flow channel 79 may be a capillary tube with a narrow flow restrictor orifice 82. This combination limits the rate at which the inflation charge housed in the secondary gas chamber 68 may escape. The flow channel 79 may be defined by a flow restrictor orifice radius 81 and a flow restrictor orifice diameter 83.

In inflators such as 20 that are configured such that the flow restrictor 80 has no component which completely closes the restrictor, the inflation charges of the primary and secondary gas chambers 66, 68 may mingle freely. As a result of this, no pressure differential between the gas chambers 66, 68 may be maintained.

The inflator 20 of the invention may alternatively provide the secondary flow of gas 96 by providing a frangible seal on the flow restrictor 80. Suitable frangible seals may include burst discs (such as burst discs 78a, 78b used with the primary gas chamber 66), scored surfaces (not shown), and compression seams (not shown). These seals may be placed to prevent gas flow from the secondary gas chamber 68 until the airbag has been activated.

Frangible seals such as those optionally used with the primary and secondary gas chambers 66, 68 include surfaces that open when the pressure within the gas chambers 66, 68 exceeds the strength of the surfaces.

One such frangible seal is a scored surface. Scored surfaces have scores that are weakened regions formed by gouging the surface. Such a score could, for example, be formed with a sharpened tool constructed of hard steel, tungsten carbide, diamond, or the like. The tool may be shaped to peel off a layer of the material of the surface, and multiple operations may be used to remove the desired amount of material. Such scores could take a wide variety of configurations. In one example, each score may simply comprise a single line disposed within the plane perpendicular to the transverse direction in relation to the surface. Alternatively, a star-like shape with multiple intersecting scores may be used. With a star-like shape, multiple wedge-shaped deformable portions would exist between the intersecting scores, and each deformable portion would bend or "bloom" outward upon failure of the scores.

The depth of scores may be selected such that the score ruptures when the pressure within the gas chamber reaches a predetermined threshold, or when the pressure shock within the gas chamber reaches a predetermined threshold. A deeper score would produce an opening that opens in response to a lower pressure or shock. Additionally, scores could be made of an equal depth to ensure that the scored surfaces open simultaneously. Further, individual scores may be varied in depth, length, width, or configuration to provide different timing and/or gas flow characteristics for the inflator.

Some score configurations produce a set of lips upon failure that may deflect outward somewhat to reach a deformed configuration. In the deformed configuration, the lips may be separated somewhat to provide an opening through which inflation gas can escape. In this configuration, the lips perform the functions accomplished by the openings and the ejection nozzles used alternatively. Indeed, the lips may be configured to deflect such that an opening of a desired size is produced.

A "compression closure" may be defined as an opening that has been closed, or nearly closed, through mechanical deformation of the material surrounding the opening. Thus, compression closures include openings that have been crimped, swaged, twisted, folded, or otherwise deformed into a closed position. Such closures may be formed through methods including the application of mechanical compression perpendicular to the axis of the opening. This compression may form a crimp or weld which may rupture in response to a high pressure or pressure shock within the gas chamber the crimp or weld is sealing. This rupture would result in the seal taking on a deformed configuration that permits the inflation gas to escape the gas chamber. The compressive force applied to close the lips and the weld strength of the weld may be selected to obtain a desired threshold pressure or shock.

Where multiple frangible seals are used in an inflator such as an inflator with multiple compartments, features such as the size and depth of a score, and the compressive force and the weld strength of a compression seam may be toleranced somewhat tightly to ensure that the frangible seals open simultaneously.

The frangible seal surface may in some cases be placed outside of the exit orifice to open to form a suitable ejection nozzle (in the place of ejection nozzles 92a, 92b) for the secondary gas chamber 68 or the first and second exit orifices 70, 72. Such configurations allow for different substances to be used for inflation charges in the primary and secondary gas chambers 66, 68, and also allow for the use of inflation charges with different pressures in the gas chambers 66, 68.

Frangible seals such as burst discs may preferably be used in inflators in which the inflation charge 84b of a secondary gas chamber 68 at least partially comprises a liquid gas producing material such as a liquefied gas. in such applications, the seals segregate the liquid from the primary gas chamber 66. In those inflators 20 of the invention that have burst discs 78a, 78b, a burst disc retention member 90a, 90b may further be included to trap and retain a spent burst disc 78a, 78b and prevent its ejection from the inflator 20.

In inflators 20 of the invention that use a frangible seal over the flow restrictor orifice, the frangible seal may be made to rupture at a specific pressure differential between the primary and secondary gas chambers 66, 68. One example of this would be an inflator in which the secondary gas chamber contained a gas pressurized to 3,000 psi and the primary gas chamber contained a gas pressurized to 2,000 psi, in which the burst disc between the gas chambers was constructed to burst at a pressure difference of 2,500 psi. After initiation of the inflator, as the primary flows of gas from the primary gas chamber begin, the pressure difference between the gas chambers increases. When the pressure of the primary gas chamber reaches about 500 psi, the burst disc would rupture. This would open the flow restrictor orifice between the primary and secondary gas chambers, and the gas generant from the secondary gas chamber would produce a secondary flow of gas that would add to the primary flow of gas created during the initiation of the airbag. This secondary flow may be used to keep the airbag inflated for an extended period of time, or to reinflate the airbag.

According to the present invention, such dual-stage inflators may include additional primary and/or secondary chambers to extend the length of time for which the inflator is capable of providing a flow of gas, as well as to increase the amount of gas that the inflator is capable of producing. Such additional secondary chambers may be placed along a longitudinal axis shared by the other secondary and primary gas chambers, or they may be placed along other axes at angles to the other gas chambers.

Upon deployment of the inflator 20, a first primary gas flow 94a may exit the primary gas chamber 66 via the first exit orifice 70, and a second primary gas flow 94b may exit the primary gas chamber 66 via the second exit orifice 72. A secondary gas flow 96 may then exit the secondary gas chamber 68 via the flow restrictor orifice 82. These gas flows may be smoothly integrated and indistinguishable from each other, or they may be separated by sufficient time that the primary and secondary gas flows are distinguishable. The primary and secondary gas flows 94a, 94b, and 96 may then travel to reach the corresponding inlet ports 60, 62 of the inflatable curtain 10. As shown, the primary and secondary gas flows 94a, 94b, and 96 travel in the longitudinal direction 13, along the longitudinal axis 58 of the inflator 20.

The use of the liquid gas producing material 86 may be beneficial because the liquid 86 will absorb heat as it vaporizes. Hence, the primary and secondary gas flows 94a, 94b, and 96 will be cool relative to other inflation gases or even possibly ambient air, and therefore less likely to damage the inflatable curtain 10. The inflatable curtain 10 may therefore be made from a comparatively less heat-resistant and quite possibly cheaper material. For example, a thinner silicon coating for the fabric of the inflatable curtain 10 may be sufficient to protect the fabric from thermal damage. Additionally, as the gas resulting from the liquid 86 begins to warm to ambient temperatures, it expands, thus extending the period of time for which the curtain 10 remains inflated and capable of providing protection to a vehicle occupant.

The steps described above for installing the airbag inflator may be reordered in many ways to suit the particular configuration of the vehicle 12. For example, the inflator 20 may first be attached to the roof rail 36 with the mounting brackets 29, and the inlet ports 60, 62 may then be fitted around the primary gas chamber 66. The inflatable cushion 10 may then be fixed in place.

The ejection nozzles 92a, 92b are optional; inflation gases may simply be allowed to freely escape the inflator 20. However, the ejection nozzles 92a, 92b may beneficially provide more accurate direction of the primary and secondary gas flows 94a, 94b, and 96. The ejection nozzles 92a, 92b may also increase the speed with which the primary and secondary gas flows 94a, 94b, and 96 escape the inflator 20, so that the gas flows have the momentum to travel further into the inflatable curtain 10. Such rapid ejection may help to ensure that the portions of the inflatable curtain 10 that are furthest from the inflator 20 are adequately inflated prior to impact of the vehicle occupant against the inflatable curtain 10.

A dual flow biaxial inflator may be activated in a variety of ways to inflate the inflatable curtain 10. In one inflator, the primary and secondary gas flows 94a, 94b, and 96 may both be triggered by the action of a single initiation assembly 100. The initiation assembly 100 may have an assembly aperture 101 that is in communication with the interior of the primary gas chamber 66. The initiation assembly 100 may, for example, be laser welded in place to prevent the escape of inflation gases through the assembly aperture 101 or ejection of the initiation assembly 100 during deployment of the inflator 20. The initiation assembly 100 may alternatively be positioned in the secondary gas chamber 68. The initiation assembly 100 may additionally comprise a burst disc, such as burst disc 78c, positioned over the initiator aperture 102.

The initiation assembly 100 may include an initiator 104, which is an electrically-triggered pyrotechnic device. The initiator 104 may, for example, have a head 106, a body 108 containing pyrotechnic material, and electrical prongs 110 through which the activation signal is received. The body 108 may be seated within an initiator retention member 112. The prongs 110 may be inserted into a plug (not shown) of the electric line 31 leading to the accelerometer 11 or the controller (not shown).

If desired, the initiation assembly 100 may also have a quantity of booster material 116 that intensifies the thermal energy provided by the initiator 104. The booster material 116 may be separated from the initiator 104 by a dome 118 designed to rupture, or even disintegrate, upon activation of the initiator 104. Alternatively, the booster material 116 may be housed within the initiation assembly 100 itself. The initiation assembly 100 may also have a housing 119 that encases and protects the booster material 116 and the initiator 104. If desired, the housing 119 may effectively isolate the initiator 104 and the booster material 116 from the pressure within the primary gas chamber 66.

The inflator 20 may be of any type, including pyrotechnic, compressed gas, and hybrid types. In the inflator of FIG. 2, the inflator 20 is a hybrid type inflator, with the pyrotechnic inflator and booster material 116 as well as a gas-producing material (or "gas generant") 84a. 84b in a compressed state. Due to the compression, the gas-producing material 84a may exist in the form of a gas 85a as well as a liquid 86 within the primary gas chamber 66. Alternatively, in a pyrotechnic inflator, the gas-producing material may not be an inert compressed liquid, gas, or mixture, but may take the form of a combustible solid or liquid.

With the inert, compressed, gas-producing material 84a of FIG. 2, the initiation assembly 100 deploys within milliseconds to produce heat that causes expansion of the gas-producing material 84a. The result is a sudden pressure shock and/or pressure increase within the gas chamber 66. The pressure shock and/or increase dislodges the burst disc 78c from the initiator aperture 102 as well as the burst discs 78a, 78b to open the first and second exit orifices 70, 72 and allow the first and second primary gas flows 94a, 94b to escape. As the inflation gas flows out of the inflator 20, the liquid 86 is vaporized to add to the volume of the primary gas flows 94a, 94b. The gas-producing materials 84b present in the secondary gas chamber 68 next begin to exit the inflator 20, thus causing the secondary gas flow 96. As a result, a considerable amount of gas can be produced by the inflator 20 over a controllable time period despite its modest size.

The use of the liquid gas producing material 86 may be beneficial because the liquid 86 will absorb heat as it vaporizes. Hence, the primary and secondary gas flows 94a, 94b, and 96 will be cool relative to other inflation gases or even possibly ambient air, and therefore less likely to damage the inflatable curtain 10. The inflatable curtain 10 may therefore be made from a comparatively less heat-resistant and quite possibly cheaper material. For example, a thinner silicon coating for the fabric of the inflatable curtain 10 may be sufficient to protect the fabric from thermal damage. Additionally, as the gas resulting from the liquid 86 begins to warm to ambient temperatures, it expands, thus extending the period of time for which the curtain 10 remains inflated and capable of providing protection to a vehicle occupant.

The inflator 20 is seen to be inexpensive and easy to manufacture in comparison to many other airbag inflators. The primary gas chamber 66 may first be formed through known methods. If desired, the primary gas chamber 66 may be provided as a single unitary piece, as depicted in FIG. 2. The burst discs 78a, 78b and/or the gas-producing material 84a may, for example, be inserted through the assembly aperture 101. The gas-producing material 84a may alternatively be inserted cryogenically, i.e., frozen and compressed into solid form and inserted through a fill opening 88 which may later be sealed with a fill opening seal 89. The initiation assembly 100 may then be inserted into the primary gas chamber 66 with the initiator aperture 102 oriented inwardly, and welded in place, for example, through laser welding.

In the alternative to one-piece construction, the gas chamber 66 may be formed as two separate pieces to facilitate the insertion of the burst discs 78a, 78b, the initiation assembly 100, and the gas-producing material 84a. For example, the first end 71 may be separated from the remainder of the gas chamber 66 by a radial seam (not shown), so that the first end 71 and the remainder of the gas chamber 66 form a tube with a circular opening. The burst disc 78a, the initiation assembly 100, and/or cryogenic material may easily be inserted into such circular openings and fixed in place. The first end 71 may then be attached, for example, through welding, to the remainder of the gas chamber 66. This process could be repeated for second end 73.

Many other aspects of the inflator 20 may be varied to suit the geometry of the vehicle 12, the size and shape of the inflatable curtain 10, and the available manufacturing equipment. FIG. 3 presents an alternative dual flow biaxial inflator, containing a number of variations from the inflator 20 of FIGS. 1 and 2. These variations may be used in any combination, or in conjunction with other variations that will be recognized by those of skill in the art, to produce a larger number of embodiments of the invention than can be illustrated or specifically described herein.

Referring to FIG. 3, an inflator 120 according to one alternative inflator of the invention is shown. The inflator 120 may have a first primary gas chamber 166a designed to be installed within an inflation port of an inflatable curtain in much the same manner as the gas chamber 66 of FIG. 2. This first primary gas chamber 166a also has an initiation assembly 100a for activating the inflator 120. The inflator 120 further includes a second primary gas chamber 166b, which may be substantially identical to the first primary gas chamber 166a. The inflator 120 further has a secondary gas chamber 168 attached to the first and second primary gas chambers 166 by flow restrictors 180a, 180b. This secondary gas chamber 168 may be segregated from the primary gas chambers 166a, 166b by frangible seals such as burst discs 178c, 178d, respectively, positioned against flow restrictors 180a, 180b.

In inflator 120, the primary gas chambers 166a, 166b are attached to the first and second inlet ports 60, 62 of the curtain 10, and sealed to prevent gas escape. The first primary gas chamber 166a contains a gas producing material 184a, which may include a gaseous reagent such as a pressurized gas 185a, and a liquid reagent such as a liquefied gas 186a. The liquefied gas comprise liquefied $N_2O$ and $CO_2$. These gas-producing materials 184a are sealed in primary gas chamber 166a by a frangible seal. In FIG. 3 this seal is omitted for clarity in this figure.

The inflator 120 is configured, as inflator 20 of FIG. 1, to produce first and second primary flows of gas 194a, 194b which pass out of the first and second primary gas chambers 166a, 166b through the exit orifices 170, 172 and the exit nozzles 192a, 192b into the curtain 10.

As briefly noted above, the inflator 120 includes first and second initiation assemblies 100a, 100b attached to primary gas chambers 166a, 166b at assembly apertures 101a, 101b. The initiation assemblies 100a, 100b include an initiator aperture 102 through which the heat and other combustion products from the initiation of the initiator 104 pass after the initiation of the initiator 104. The initiation assemblies 100a, 100b further include a head 106, a body 108, and prongs 110 for connecting the initiator 104 with the electronic system (not shown), including the accelerometer (not shown), of the vehicle. The initiator 104 is retained by an initiator retention member 112 and a housing 119 to keep the initiator in place. The initiator may also have booster material (not shown) contained in a dome (not shown) near the initiator 104 in order to aid in the production of the primary flows of gas 194a, 194b. Finally, the initiator assemblies 100a, 100b may further include burst discs 178e, 178f, respectively, which cover the initiator apertures 102 prior to the initiation of the inflator.

The inflator 120 of FIG. 3 further includes flow restrictors 180a, 180b which join the first primary gas chamber 166a with the secondary gas chamber 168, and join the second primary gas chamber 166b to the secondary gas chamber 168. Here, the flow restrictors 180a, 180b may take the form of restricted flow channels 179. Such a restricted flow channel 179 may be similar to a capillary tube. The restricted flow channel 179 further includes a narrow flow restrictor orifice 182 that limits the rate at which the inflation charge housed in the secondary gas chamber 168 may escape. The flow channel 179 is defined by a flow restrictor orifice radius 181 and a flow restrictor orifice diameter 183.

The secondary gas chamber 168 is configured to provide a secondary flow of gas 196 into the first and second primary gas chambers 166a, 166b, and subsequently into the inflatable curtain 10. The secondary gas chamber 168 is linked to the first and second primary gas chambers 166a, 166b through the flow restrictors 180a, 180b. The primary gas chambers 166a, 166b may also include a fill opening 88 and a fill opening seal 89 for filling the primary gas chambers 166a, 166b with a gas producing material 184a, 184b, which may, as in the inflator 20 of FIGS. 1 and 2, include a gaseous gas producing material 185a, 185b. The secondary gas chamber may include such a material 185c and/or a liquid gas producing material 186 such as a liquefied gas. In inflator 120, since the first and second primary gas chambers 166a, 166b are separated from the secondary gas chamber 168 by the burst discs 178c, 178d and their associated structures, including the flow restrictors 180a, 180b, the gas chambers 166a, 166b, and 168 may include different gas producing materials 184a, 184b, and 184c.

The exit orifices 170, 172 may be associated with a burst disc 178a, 178b and accompanying interior caps 174a, 174b. The burst discs 178a, 178b are positioned over openings 170, 172 and are held in position against interior caps 174a, 174b by the pressurized contents of the primary gas chambers 166a, 166b. The exit orifices may also contain burst disc retention members 190a, 190b that, as described above, contain the burst discs after initiation of the inflator to prevent ejection of the discs and any potential accompanying damage.

In use, the inflator of the invention may be configured to provide a primary flow of gas and a secondary flow of gas. The primary flow of gas is generated from a gas generant supply placed within the primary gas chamber(s). This primary flow of gas is initiated either directly by an initiator assembly placed within the primary gas chamber(s) or indirectly by an initiator assembly placed within the secondary gas chamber(s). The initiation of the device ruptures the frangible seals of the primary gas chamber(s) and heats the gas generant of the primary gas chamber, thus causing gas formation and gas flow from the primary gas chamber(s). This primary flow of gas is divided between first and second primary flows of gas as it passes through the first and second exit orifices of the primary gas chamber(s), and preferably channeled into an attached airbag such as an inflatable curtain.

Following the primary flow of gas, a secondary flow of gas may be initiated. This flow may be initiated passively in inflators where the flow restrictor, though sufficiently narrowed to meter the flow of gas, has no complete blockage. Such a passive initiation occurs when the initiator has fired and the primary gas chamber(s) has begun to empty, thus decreasing the pressure in the primary gas chamber(s). Passive initiation may also be achieved when the secondary gas chamber includes a pressure sensitive frangible seal such as a burst disc configured to rupture at a specific pressure gradient. In such an inflator, the gas generants housed in the primary and secondary gas chambers would be pressurized. Upon partial emptying of the primary gas chamber(s) after initiation of the primary gas flow, the pressure gradient between the high pressure of the secondary gas chamber and the decreasing pressure of the primary gas chamber(s) would be sufficient to rupture the seal and initiate the secondary gas flow.

Alternatively, an initiator placed in each gas chamber may initiate both the primary and secondary flows of gas. In such an inflator, a frangible seal may be associated with the secondary gas chamber to prevent early escape of the gas generants stored within the secondary gas chamber. In these inflators, the initiators may be optionally connected to a controller which may control the initiation of the primary gas chamber(s) separately from the initiation of the secondary gas chamber. Such inflators may thus be enabled to function in a manner adjustable to the individual circumstances of a given collision. "Smart" inflators such as these may be tuned to fire only the first initiator and cause only the primary flow of gas in minor collisions. Additionally, such inflators could be tuned to detect severe collisions and fire each initiator at adjustable intervals to assure sufficient extended inflation of the inflatable curtain or airbag connected to the inflator to protect a vehicle occupant. Such function would be especially useful in rollover collisions, which could be detected by the controller module and responded to by firing both initiators in sequence so as to provide an extended flow of inflation gas and thus an airbag that is supportive over an extended period of time relative to conventional airbags. Finally, the controller could be configured to initiate a secondary flow of inflation gas to completely reinflate the airbag using the inflation charge of the secondary gas chamber in response to a second collision occurring shortly after the triggering collision, or on the occurrence of some other suitable event.

The dual stage inflators of the present invention thus provide a significant advancement in airbag design. Through the addition of the secondary gas chamber, the use of the flow restrictor, and the refinement of exit orifice designs, airbag systems may be produced and installed with less time and expense. Furthermore, the use of axial flow exit orifices and secondary gas chambers with flow restrictors enables a single inflator to rapidly and uniformly provide inflation gas for an airbag possibly comprising multiple protection zones, and then to maintain an inflation pressure sufficient to protect a vehicle occupant over a period of time. This inflation pressure may be maintained using methods such as providing a secondary stream of inflation gas to the airbag. The inflators of the invention may also include a primary inflation flow of gas generated from a liquefied gas. Due to the latent heat of vaporization of the liquid gas, the inflation flow of gas would be cooler than the ambient air surrounding the airbag. The cool inflation gas would then warm and expand, thus reinforcing the inflation pressure of the airbag.

As explained above, such airbag inflators yielding extended gas flow are especially important in rollover collisions in which lateral protection of a vehicle occupant is needed for periods of time that exceed those protection periods required or even desired in ordinary airbag applications. Such extended time periods may range from five seconds to eight seconds to even twenty seconds. The provision of an airbag inflator that makes such extended inflation possible is an improvement in the art.

The present invention may be embodied in other specific forms without departing from its structures, methods, or other essential characteristics as broadly described herein and claimed hereinafter. The described inflators are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A dual stage biaxial inflator for a vehicular airbag system, the inflator comprising:

at least one primary gas chamber providing first and second exit orifices displaced from each other along a longitudinal axis of the inflator, each of the exit orifices having an open configuration and a closed configuration, wherein each exit orifice is disposed in an exterior wall of the inflator;

a secondary gas chamber;

at least one flow restrictor positioned between the at least one primary gas chamber and the secondary gas chamber to enable gas from the secondary gas chamber to reach the first and second exit orifices at a limited flow rate; and an initiator in communication with an interior of the at least one primary gas chamber to initiate a flow of gas through at least one of the exit orifices.

2. The dual stage biaxial inflator of claim 1, wherein the dual stage inflator comprises two primary gas chambers, wherein each of the exit orifices is disposed on one of the two primary gas chambers.

3. The dual stage biaxial inflator of claim 1, wherein the dual stage inflator comprises at least two secondary gas chambers.

4. The dual stage biaxial inflator of claim 1, wherein at least one of the exit orifices configured to regulate a flow rate of the flow of gas.

5. The dual stage biaxial inflator of claim 1, wherein the initiator is secured to the primary gas chamber.

6. The dual stage biaxial inflator of claim 1, wherein the flow restrictor comprises a restricted flow channel.

7. The dual stage biaxial inflator of claim 1, wherein the flow restrictor comprises a frangible seal.

8. The dual stage biaxial inflator of claim 7, wherein the flow restrictor comprises a burst disc.

9. The dual stage inflator of claim 1, wherein the inflator further comprises a gas generant for providing the flow of gas.

10. The dual stage inflator of claim 9, wherein the gas generant comprises a mixture of gases.

11. The dual stage inflator of claim 10, wherein the mixture of gases comprises liquefied gases.

12. The dual stage inflator of claim 11, wherein the mixture comprises liquefied $N_2O$ and $CO_2$.

13. The dual stage inflator of claim 9, wherein the gas generant comprises a liquefied gas.

14. The dual stage inflator of claim 13, wherein the gas generant further comprises a solid.

15. The dual stage inflator of claim 9, wherein the gas generant is a combination of a gas and a liquefied gas.

16. The dual stage inflator of claim 9, wherein the gas generant comprises a solid.

17. The dual state inflator of claim 16, wherein the gas generant further comprises a gas.

18. A dual stage biaxial inflator for a vehicular airbag system, the inflator comprising:

at least one primary gas chamber providing first and second exit orifices displaced from each other along a longitudinal axis of the inflator, each of the exit orifices having an open configuration and a closed configuration, wherein each exit orifice is disposed in an exterior wall of the inflator;

a secondary gas chamber;

a flow restrictor comprising a restricted flow channel sized to limit the flow rate of gas from the secondary gas chamber, said flow restrictor being positioned between the at least one primary gas chamber and the secondary gas chamber to enable gas from the secondary gas chamber to reach the first and second exit orifices at a limited flow rate; and an initiator in communication with an interior of the at least one primary gas chamber to selectively initiate a flow of gas through at least one of the exit orifices.

19. The dual stage biaxial inflator of claim 18, wherein the inflator further comprises a gas generant for providing the flow of gas out of at least one of the exit orifices.

20. The dual stage biaxial inflator of claim 19, wherein the gas generant comprises a mixture of gases.

21. A dual stage biaxial inflator for a vehicular airbag system comprising:

a primary gas chamber having a longitudinal axis, a first exit orifice at a first end of the primary gas chamber, and a second exit orifice at a second end of the primary gas chamber; the first and second exit orifices having an open and a closed configuration;

a secondary gas chamber capable of gaseous communication with said primary gas chamber;

a flow restrictor positioned between the primary gas chamber and the secondary gas chamber; and an initiator in communication with the interior of one of said gas chambers, the initiator being configured to selectively initiate a flow of gas through at least one of the exit orifices.

22. The dual stage biaxial inflator of claim 21, wherein the first and second exit orifices are substantially the same size; such that upon activation of the inflator, substantially identical amounts of gas leave the inflator through the first and second exit orifices.

23. The dual stage biaxial inflator of claim 21, wherein the first and second exit orifices are of substantially different sizes; such that upon activation of the inflator, substantially different amounts of gas leave the inflator through the first and second exit orifices.

24. The dual stage biaxial inflator of claim 21, wherein the flow restrictor comprises a physical barrier configured to seal the flow restrictor until the flow of gas is initiated, said physical barrier comprising a frangible seal.

25. The dual stage biaxial inflator of claim 24, wherein the frangible seal is a burst disc.

26. The dual stage biaxial inflator of claim 21, wherein the initiator is in communication with the primary gas chamber.

27. A dual stage biaxial inflator for a vehicular airbag system comprising:

a first primary gas chamber having a first longitudinal axis and a first exit orifice, the first exit orifice having an open and a closed configuration;

a second primary gas chamber having a second longitudinal axis and a second exit orifice, the second exit orifice having an open and a closed configuration;

a secondary gas chamber;

a plurality of flow restrictors positioned between the primary gas chambers and the secondary gas chamber to enable gas from the secondary gas chamber to reach the first and second exit orifices at a limited flow rate; and an initiator in communication with the interior of one of said primary gas chambers, such that activation of the initiator causes the inflator to initiate a flow of gas through at least one of the first and second exit orifices.

28. The dual stage biaxial inflator of claim 27, wherein the first and second exit orifices are substantially the same size; such that upon activation of the inflator, substantially identical amounts of gas leave the inflator through the first and second exit orifices.

29. The dual stage biaxial inflator of claim 28, wherein the first and second primary gas chambers are coaxial.

30. The dual stage biaxial inflator of claim 27, wherein the first and second exit orifices are of substantially different sizes; such that upon activation of the inflator, substantially different amounts of gas leave the inflator through the first and second exit orifices.

31. The dual stage biaxial inflator of claim 27, wherein each flow restrictor comprises a physical barrier which seals the flow restrictor until the flow of gas is initiated, said physical barrier comprising a frangible seal.

32. The dual stage biaxial inflator of claim 31, wherein the frangible seal is a burst disc.

33. The dual stage biaxial inflator of claim 27, wherein the inflator comprises an initiator in communication with each primary gas chamber.

34. A dual stage biaxial inflator for a vehicular airbag system comprising:

a primary gas chamber with a first exit orifice at a first end and a second exit orifice at a second end, each exit orifice having open and closed configurations;

a secondary gas chamber in gaseous communication with said primary gas chamber;

at least one flow restrictor positioned between the primary gas chamber and the secondary gas chamber; and an initiator positioned in the primary gas chamber, wherein the initiator is in communication with the interior of the primary gas chamber, and is configured to initiate a first primary flow of gas through the first exit orifice and a second primary flow of gas through the second exit orifice.

* * * * *